United States Patent [19]
Dudley et al.

[11] 4,424,891
[45] Jan. 10, 1984

[54] EQUIPMENT FOR RECLAIMING THE WASTE PRODUCTS OF MACHINING

[75] Inventors: Russell D. Dudley; Larry D. Areaux, both of Kalamazoo; Robert H. Dudley, Portage, all of Mich.

[73] Assignee: Reclamet, Inc., Kalamazoo, Mich.

[21] Appl. No.: 275,732

[22] Filed: Jun. 22, 1981

[51] Int. Cl.³ .............................................. B65G 11/00
[52] U.S. Cl. ................................ 193/2 R; 193/31 R; 241/186 A
[58] Field of Search .................. 193/2 R, 2 C, 2 D, 4, 193/14, 31; 241/186 R, 186 A, 186.2, 186.3

[56] References Cited

U.S. PATENT DOCUMENTS

| | | | |
|---|---|---|---|
| 1,652,250 | 12/1927 | Morrow | 193/31 A |
| 3,202,367 | 8/1965 | Nixon | 241/186.2 |
| 3,545,690 | 12/1970 | Burian et al. | 241/186.2 |
| 4,099,473 | 7/1978 | Mackenzie et al. | 241/186 A X |
| 4,174,920 | 11/1979 | Knox | 193/31 A |
| 4,377,230 | 3/1983 | Burkner | 193/14 X |

Primary Examiner—John J. Love
Assistant Examiner—Gene A. Church
Attorney, Agent, or Firm—Price, Heneveld, Huizenga & Cooper

[57] ABSTRACT

A system for processing masses of heterogeneous machining scrap metal through bulk reception, crushing of the ribbon and wire components of the scrap, separation of the chunk components and stripping the rest of the scrap of its cutting oils by centrifuging including metering the rate of feed of the scrap to the crusher and transporting the crushed component of the scrap to the centrifuge without causing it to become ensnarled and formed into balled up masses.

2 Claims, 8 Drawing Figures

EQUIPMENT FOR RECLAIMING THE WASTE PRODUCTS OF MACHINING

BACKGROUND OF THE INVENTION

The invention relates to a system and equipment for handling scrap metal resulting from machining operations. This scrap metal, consisting of a variety of shapes and sizes, is discharged from the machining operation in an oily condition having become coated with the cutting oils used to lubricate and cool the tools. Substantial quantities of the oil remain on the scrap.

The scrap is received in many forms including chips, turnings and chunks. The turnings are often long ribbons or wire-like strips which are coiled upon themselves and, in the process of being handled, become snarled and interlocked with each other to form balls and large masses from which the cutting oils cannot be effectively removed. The removal of the oil is essential because it is a costly material and the scrap is considered undesirable until the oils have been stripped from it. Heretofore, it has been known to have processing systems which utilize a conveyor for feeding the scrap to a crusher and including means for separating the bigger chunks of metal from the mass before the mass enters the crusher. It has also been a known practice to recombine the metal discharged by the crusher with the larger chunks which were separated prior to entry of the material into the crusher and then to transport the combined material by suitable means such as a flight conveyor, screw conveyor or a reciprocating conveyor to a feed conduit which discharges into an oil separating centrifuge. The conduit is equipped with means for separating the large chunks from the rest of the material so that only the chips and crushed turnings and material of a similar size enters the centrifuge.

BRIEF DESCRIPTION OF THE INVENTION

The handling of the coiled turnings has proven to be a serious problem. Because of the tendency to ball into large masses which cannot be succesfully centrifuged to strip the metal of the cutting oils, it is necessary for this type of scrap to be processed through crushers to break up the coils of wire and ribbon-like materials into smaller pieces. While the crushers do break up the long coils and, in effect, chop and tear them into shorter sections, the product discharged by the crusher still constitutes short sections of curled and curved metal ribbons and wire-like materials. As these are being transported from the crusher to the centrifuge, these will relock together into a snarly, ball-like mass quite unsuitable for processing in the centrifuge. It has been determined that all forms of pushing, pulling or otherwise mechanically forcing these crushed materials to move between the crusher and the centrifuge are incapable of delivering the materials to the centrifuge in suitable condition for centrifuging. It has been determined that these materials can be delivered in the same detached, random condition they were discharged by the crusher if the entire equipment is so arranged that all transport between the crusher and the centrifuge is entirely by gravity. This arrangement does not interfere with the separation system for eliminating from the materials the chunks or heavies which should not be introduced into the centrifuge.

DESCRIPTION OF THE PREFERRED EMBODIMENT

Figure 1:
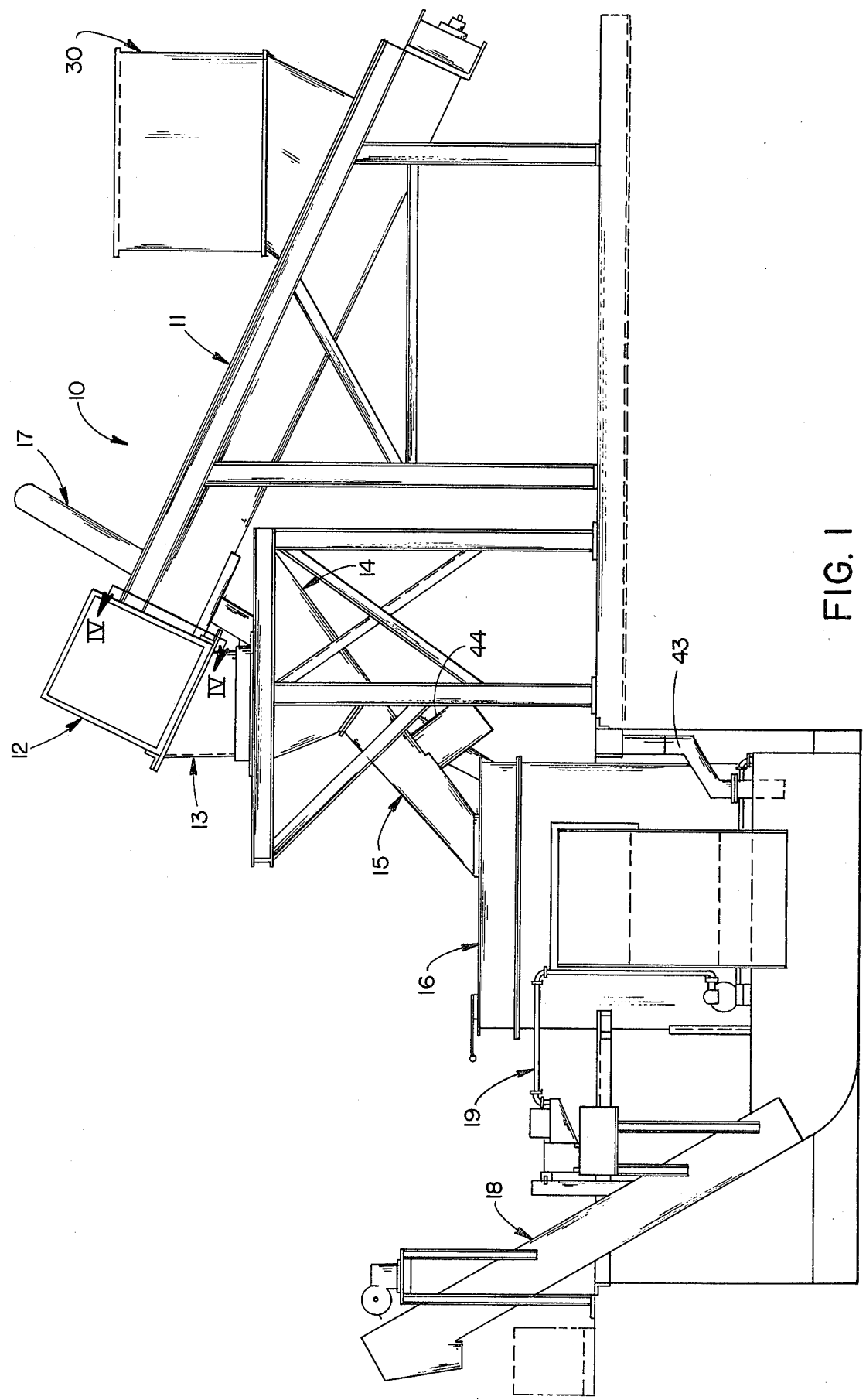
FIG. 1 is a side elevation view of the system of this invention.

The numeral 10 indicates a system having a receiving conveyor 11, a crusher 12, a pair of chutes 13 and 14 which discharge into a conduit 15. The conduit 5 discharges into a centrifuge 16 from which the solids are removed by a conveyor 17. The oversized chunks separated from the rest of the scrap between the crusher and the centrifuge are removed by the conveyor 18. Recovered oil is removed by the piping 19.

The machine scrap metal in random form consisting of coils of ribbon and wire-like material combined with chips and large chunks such as cut off ends of bars and rods and, in some cases scrap parts, are dumped by any suitable means into the receiving bin 30, the bottom of which is open into the receiving end of the receiving conveyor 11.

Figure 2:
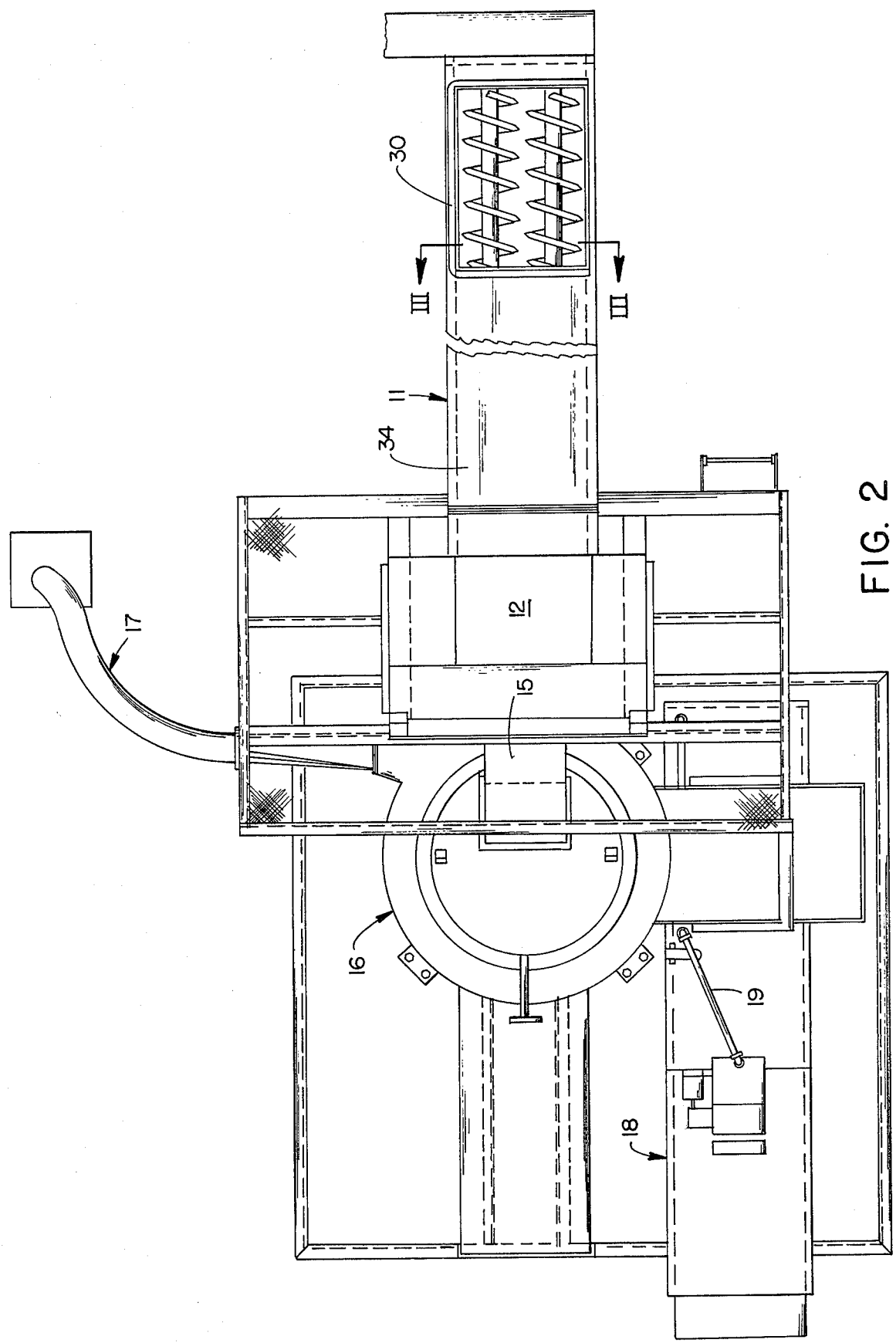
FIG. 2 is a plan view of the system of this invention.
Figure 3:
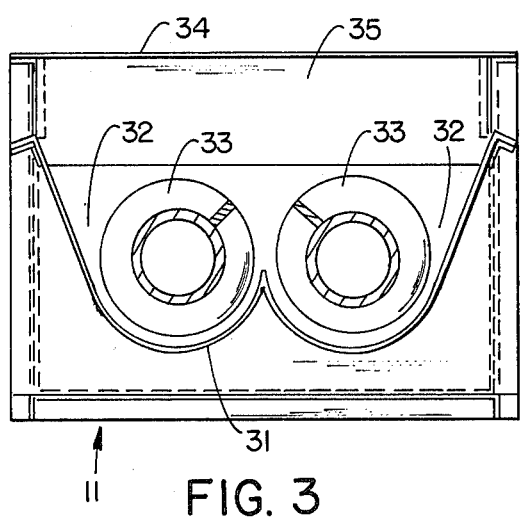
FIG. 3 is a sectional view taken along the plane III—III of FIG. 2.
Figure 4:
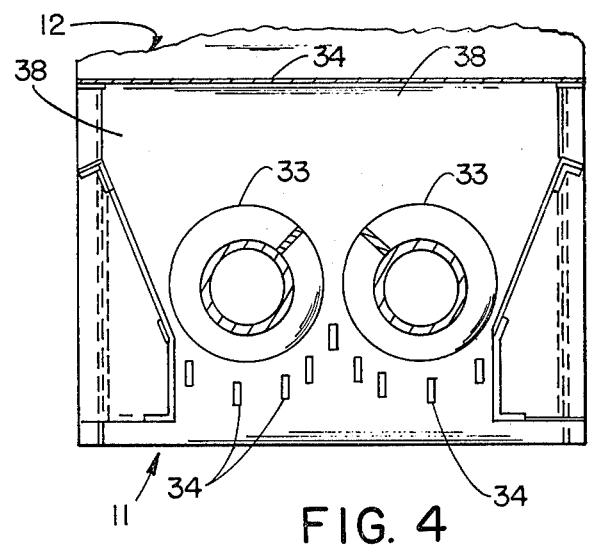
FIG. 4 is a sectional view taken along the plane IV—IV of FIG. 1.

The receiving conveyor 11, as best seen in FIG. 3, has a generally W-shaped bottom or trough 31 forming a pair of parallel channels 32 in each of which is a helical or screw conveyor 33. The screws are driven in a conventional manner by any suitable power source, not illustrated. In the area beneath the receiving bin 30, the top of the conveyor is open. However, the remainder of the conveyor is closed by a top 34 (FIGS. 2 and 4). Where the conveyor 11 passes out from beneath the bottom of the bin 30, a metering plate or partition 35 is provided. The bottom edge of the plate is positioned a short distance above the tops of the helical screw and provides a means of limiting the size of the opening through which the material must pass as it leaves the area beneath the bin. The metering of the scrap materials as they leave the area beneath the receiving bin is important to the proper functioning of the system because this results in a more uniform feed rate to the crusher whereby the crusher will not at one point in time be starved of incoming material and at another point in time be overloaded with large quantities of the material. This greatly improves the results produced by the crusher because it enables the crusher to effect a more uniform and thorough breakdown of the snarly ribbons and wire-like materials which are the particularly troublesome portion of the scrap materials. It is also important because the rate at which the crusher is fed also determines the rate at which the centrifuge is supplied with materials. A reasonably uniform flow feed rate to the centrifuge is particularly advantageous in obtaining a thorough stripping of the oils from the scrap material.

The discharge end of the receiving conveyor 11 discharges into a receiving port 38 in one side of the crusher 12. For a short distance ahead of the discharge end of the conveyor and immediately adjacent the crusher 12 the bottom trough 31 of the conveyor is eliminated and a plurality of grizzly bars 36 are substituted (FIG. 4). These grizzly bars extend lengthwise of the conveyor and are so spaced that the snarly, balled materials will be prevented from passing between them and will continue along the grizzly bars and be forced into the crusher 12. However, the spacing of the grizzly bars is such that the small chips together with the large chunks or heavies, such as bar and rod ends, will drop between the bars and thus be separated from the rest of the scrap. The elimination of the heavies and big chunks is important because when these are fed into the crusher they can damage or stall the crusher which, of course, shuts down the system until the situation is corrected. Even in the case of automatically reversing crushers, the time required to reverse the crusher, discharge the trapped piece and then reinitiate operation represents a substantial loss of production time. This system of by-passing the heavies or large chunks around the crusher is illustrated and described in copending United States patent application, Ser. No. 132,519, entitled "Chip and Turnings Separator and Crusher", filed Mar. 21, 1980, and assigned to a common assignee with this application.

Of course, a large number of small chips and similar materials will pass through the grizzly bars along with the large chunks. In general these are of a size that they do not need further processing prior to entry into the centrifuge. As a practical matter, at this point there is no means for separating them from the large chunks and it is not necessary since these materials do not have to be processed by the crusher.

Figure 5:
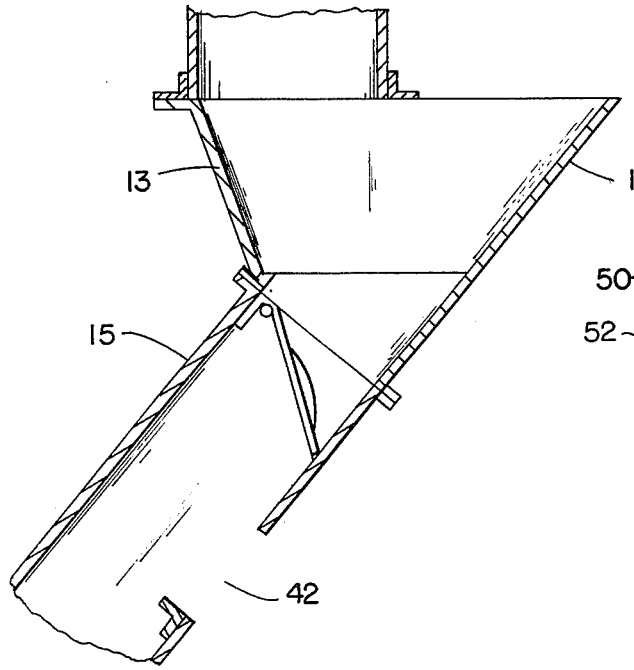
FIG. 5 is a fragmentary sectional view of the discharge chutes beneath the crusher and the grizzly bar separator.

The material separated by the grizzly bars drops into a chute 14 and from the end of the chute 14 finds its way into the conduit 15. The material processed by the crusher is discharged through the bottom of the crusher into a chute 13 which also discharges into the common conduit 15. The movement of the scrap discharged through the grizzly bars and that from the crusher is moved entirely by gravity to the conduit 15. The conduit 15 in turn, is inclined at a substantial angle such that the material will continue to move down the conduit by gravity. Substantially, at the point where the chutes discharge into the conduit 15, a pivoted damper 40 is provided. It is hinged at the top and biased to close by a weight 41. The weight is such that the damper is not or only slightly responsive to air pressure differentials between the chutes and the conduit. The pivotal mounting of the damper permits it to swing open sufficiently to pass the scrap from the chutes into the conduit 15. Intermediate the point where the chutes 13 and 14 discharge into the top of the conduit 15 and the conduit discharges into the centrifuge 16, a pneumatic separator is provided. This separator operates by means of the reduced pressure created within the conduit 15 by the centrifuge which draws air in substantial volume through the opening 42 in the bottom of the conduit (FIG. 5). The damper 40 restricts entry of air into the conduit substantially to that entering through the opening 42. The speed and volume of the air entering through the opening 42 is sufficient to entrain all of the crushed scrap together with all of the chips and other small pieces of scrap and carry them past the opening 42. However, the heavy chunks, because of their weight to area ratio, will not be entrained and, as a result, drop by gravity through the opening 42 into tube 43 which conducts them to the conveyor 18. The hood 44 controls the motion of these chunks and drops them into the pipe 43. This arrangement is not described in further detail inasmuch as it is the subject of application for U.S. Pat. Ser. No. 62,502, entitled "Air Inlet Material Separator For Chip Centrifuge", filed July 31, 1979, and having a common assignee with this application.

The centrifuge 16 will not be described in detail because the specific features of its construction are not part of this invention and its construction is disclosed in U.S. Pat. No. 4,253,960, entitled "Chip Discharge For Continuous Chip Wringer", issued Mar. 3, 1981.

Figure 8:
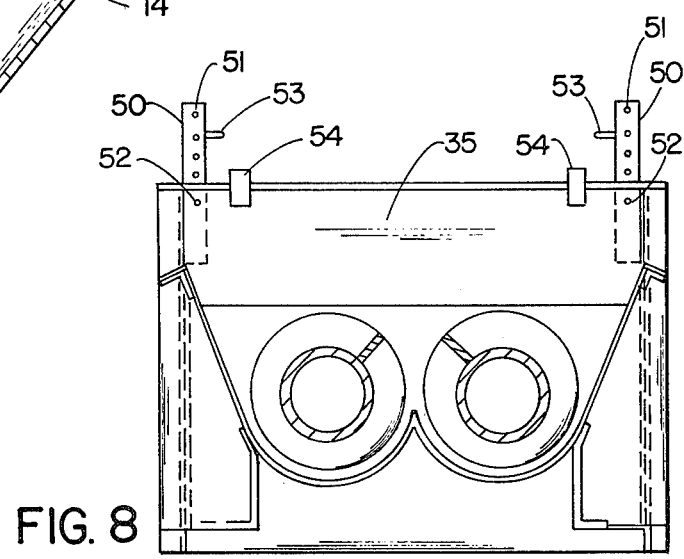
FIG. 8 is a sectional elevation view taken along the plane VIII—VIII of FIG. 7.
Figure 6:
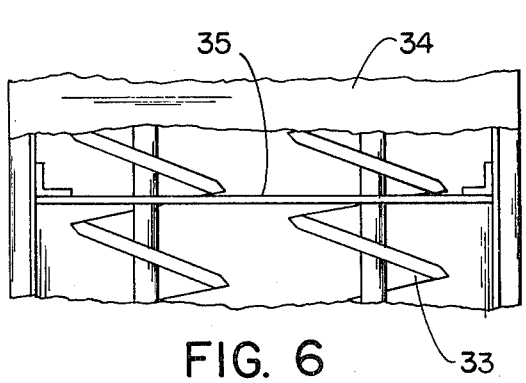
FIG. 6 is a fragmentary, partially broken plan view of the metering plate for the receiving conveyor.
Figure 7:
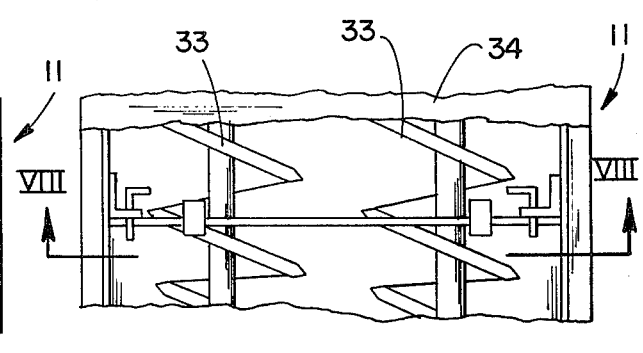
FIG. 7 is a view similar to FIG. 6 illustrating a modified construction for the metering plate.

FIGS. 7 and 8 illustrate a modification of this invention in which the metering plate is made adjustable to accommodate various feed rates for the crusher and to give the equipment flexibility to adapt its processing rate to the type of machining scrap which it is processing. In this case, the plate 35a is seated against extended vertical supports 50, each of which is equipped with a plurality of holes 51 spaced lengthwise of the supports. The plate is also equipped with a pair of holes 52, one adjacent each outer top corner and vertically aligned with the holes 51. When the plate is raised, the holes 52 are aligned with one pair of the holes 51 and then the plate is secured by insertion of a pair of pins 53. In FIGS. 7 and 8, the pins 53 are illustrated in storage position because the metering plate 35a is at its lowest position, and, therefore, the pins are not in use. The plate is also provided with a pair of handles 54 to facilitate manipulation.

The invention provides a system for processing scrap which is capable of handling on a fully automatic basis a wide range of scrap materials without requiring frequent attention by operators because of malfunction. For the same reason it is characterized by materially improved operating efficiency because of the absence of down time. It also produces an improved product, both because the crusher has a substantially uniform rate of feed and because the material after crushing is so handled that it does not become reentangled into balls and snarls which will not effectively process in the centrifuge to strip the oil. It, thus, has solved problems which have not heretofore been solved and does so by utilizing means which are both space and energy efficient.

Having described the preferred embodiment of the invention together with a modification thereof, it will be obvious that other modifications may be made incorporating the principles of the invention. Such modifications as do not depart from the principle of the invention are to be considered as included in the hereinafter appended claims unless these claims by their language expressly state otherwise.

The embodiments of the invention in which an exclusive property or privilege is claimed are defined as follows:

1. In a system for reclaiming the scrap metal and cutting oils produced by machining, said scrap metal including chips, metal chunks, and metal turnings, a receiving bin into which the scrap metal in random condition is dumped; a conveyor housing having a screw conveyor communicating with the bottom of said bin and passing out through one wall of said bin, a metering plate secured to said one wall above said conveyor, the bottom edge of said plate being positioned above and closely adjacent said conveyor for metering the rate of discharge of the scrap metal from said bin; a scrap crusher having a receiving post in one of its sides; the discharge end of said conveyor discharging into said receiving post; grizzly bars forming the bottom of said conveyor housing beneath said screw conveyor adjacent said receiving post for separating by gravity the chips and chunk portions of the scrap metal from the metal turnings; a depending vertical first chute beneath said crusher for receiving crushed material discharged from said crusher; a second depending chute beneath said grizzly bars for receiving the chips and chunks passing between said bars; the upper ends of said chutes being sealed except for air passing through said crusher and said grizzly bars, said first and second chutes discharging into a downwardly inclined tubular conduit; the lower end of said conduit discharging into a centrifuge having means for creating a negative air pressure in said conduit; an air inlet opening in the lower wall of said conduit for introducing at a velocity sufficient to entrain and transport the crushed materials, chips and oils to the centrifuge while permitting the chunks to pass by gravity through the air inlet whereby all of said scrap material discharged through said grizzly bars and from said crusher is moved by gravity until it is discharged or enters said centrifuge.

2. The system described in claim 1 wherein said metering plate is vertically adjustable.

* * * * *